May 15, 1951      G. C. MOLOTZAK      2,553,104
SELF-LUBRICATING DRIVE MECHANISM
Filed Dec. 20, 1948
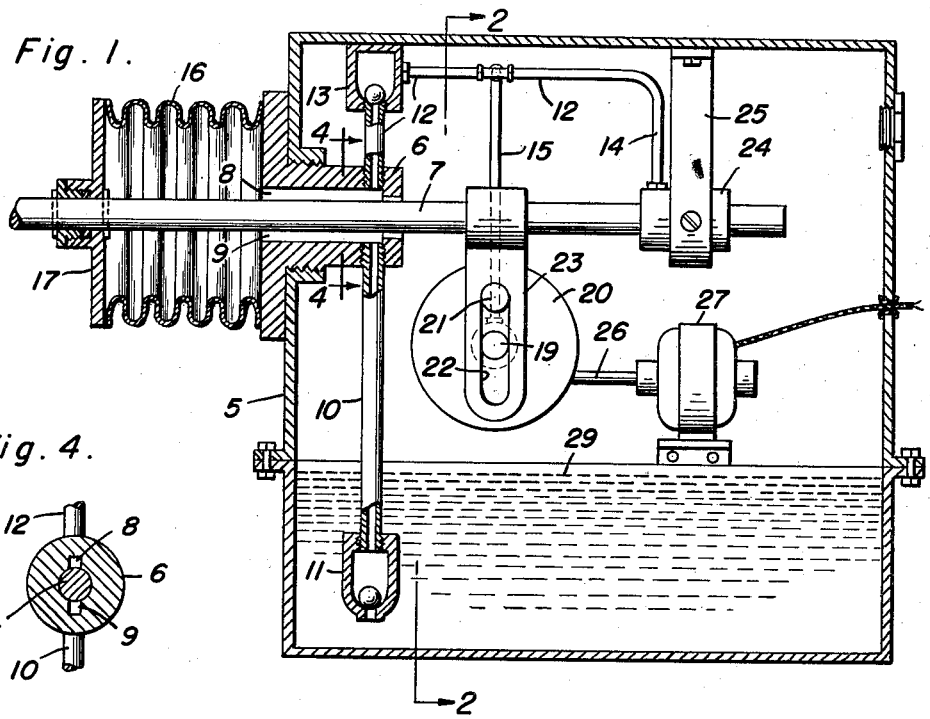
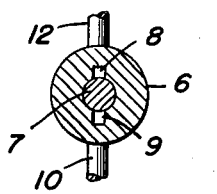
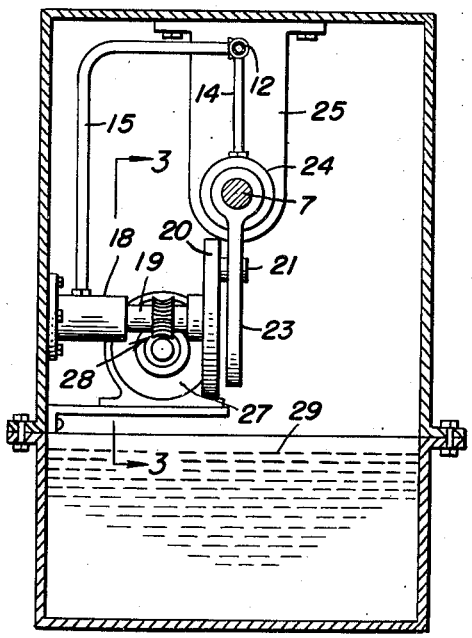
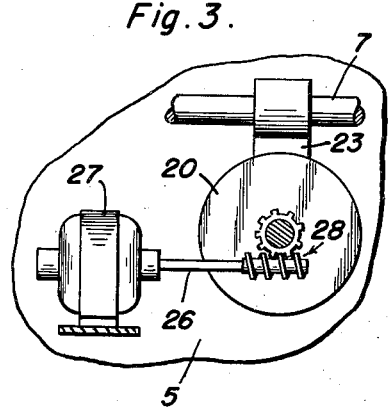
Inventor
George C. Molotzak
By Clarence A. O'Brien
and Harvey B. Jackson
Attorneys Patented May 15, 1951

2,553,104

UNITED STATES PATENT OFFICE 2,553,104

SELF-LUBRICATING DRIVE MECHANISM

George C. Molotzak, Coaldale, Pa.

Application December 20, 1948, Serial No. 66,194

3 Claims. (Cl. 184—6)

This invention relates to a drive mechanism wherein rotary motion is converted to reciprocating motion, the mechanism being especially designed for actuating the reciprocable feeder plate of a mechanical furnace stoker or the reciprocable grate of a furnace.

The primary object of the present invention is to provide a simple and efficient mechanism of the above kind embodying novel means to forcibly feed a lubricating liquid to the bearings thereof.

The exact nature of the present invention, as well as other objects and features thereof, will become apparent from the following description when considered in connection with the accompanying drawing, in which:

Figure 1 is a vertical longitudinal sectional view of a drive mechanism embodying the present invention;

Figure 2 is a transverse section taken on the line 2—2 of Figure 1;

Figure 3 is a fragmentary vertical section taken on the line 3—3 of Figure 2.

Figure 4 is a section taken on the line 4—4 of Figure 1.

Referring in detail to the drawing, 5 indicates a casing having an opening in the upper portion of one end wall thereof within which is fitted and secured a bushing 6 forming a slide bearing for a reciprocable rod 7. The bushing 6 has longitudinal internal grooves 8 and 9 that extend from points near the inner end of said bushing through the outer end thereof. A lubricant supply pipe 10 has its upper end connected to bushing 6 in communication with the groove 9, and this pipe is located within and extends to a point near the bottom of casing 5 where it is provided with a foot valve 11. A discharge pipe 12 is connected at one end to bushing 6 in communication with the groove 8 and has a non-return check valve 13 interposed therein. Beyond the check valve 13, the discharge pipe 12 has branches 14 and 15 for a purpose to be later explained. An expansible chamber 16 of the bellows type surrounds the rod 7 outside the casing 5, one end of said chamber being open and secured to the bushing 6, and the other end of said chamber being closed by a plate 17 secured on the rod 7. The assembly of parts 6, 16 and 17 forms a hermetic liquid seal and pump which, upon reciprocation of rod 7, alternately draws lubricant through pipe 10 from the lower portion of casing 5 and forces it through pipe 12 via grooves 9 and 8. This keeps the contacting surfaces of bushing 6 and rod 7 lubricated.

Journaled transversely of casing 5 in a bearing 18 is a rotatable shaft 19 having a crank member or disk 20 secured thereon, the crank member 20 having a crank pin 21 engaged in the longitudinal elongated slot 22 of an arm 23 fixed to and depending from rod 7. Rod 7 also slides through a bearing 24 supported in spaced aligned relation to bushing 6 within the casing 5 by a bracket 25. Shaft 19 is operatively connected to the drive shaft 26 of a rotary electric motor 27 by a worm gearing 28, said motor being suitably mounted in casing 5 above the level of the lubricant provided in the lower portion of casing 5 as indicated at 29.

The branch 14 of pipe 12 delivers lubricant to bearing 24, and the branch 15 delivers lubricant to the bearing 18.

When motor 27 is thrown into operation, it drives crank member 20 which, in turn, causes reciprocation of rod 7 through the medium of crank pin 21 and arm 23. Reciprocation of rod 7 causes alternate extension and collapsing of the expansible chamber 16 so as to intermittently force lubricant to the bearings 18 and 24. Rod 7 may be connected to the element to be actuated, such as a reciprocable furnace grate or the reciprocating feeder plate of a mechanical furnace stoker.

From the foregoing description, it is believed that the construction, operation and advantages of the present invention will be readily understood and appreciated by those skilled in the art. Modifications and changes in details of construction are contemplated, such as fairly fall within the spirit and scope of the invention as claimed.

What is claimed as new is:

1. A drive mechanism including a bearing, a rotatable shaft journaled in said bearing, a motor operatively connected to said shaft for driving the same, spaced slide bearings, a rod reciprocable in said slide bearings at a right angle to said shaft and adapted to be connected to an element to be actuated, means operatively connecting said shaft to said rod, a bellows-type expansible chamber attached to said rod and one of said slide bearings so as to be alternately extended and collapsed upon reciprocation of said rod, a valved lubricant supply pipe communicating with said expansible chamber through said one slide bearing, and a valved lubricant discharge pipe communicating with said expansible chamber through said one slide bearing, said discharge pipe having branches for delivering lubricant to the respective bearings, said expansible chamber acting to alternately draw lubricant through the supply pipe and force it through the discharge pipe upon reciprocation of said rod.

2. The construction defined in claim 1, wherein said one bearing has longitudinal internal grooves respectively providing communication between the lubricant supply pipe and said expansible chamber and between said expansible chamber and said lubricant discharge pipe.

3. A drive mechanism including a lubricant containing casing having a bearing therein, a rotatable shaft journaled in said bearing, a motor mounted in said casing and geared to said shaft, spaced aligned slide bearings, one of said slide bearings being mounted in the casing and the other extending through a vertical wall of the casing, a rod extending through and reciprocable in said slide bearings and adapted to be connected to an element to be actuated, means operatively connecting said shaft to said rod, a bellows type expansible chamber disposed outside said casing and attached to said rod and said other slide bearing so as to provide a hermetic seal for preventing escape of lubricant from the casing about said rod, a valved lubricant supply pipe in said casing communicating with said expansible chamber through said other slide bearing, and a valved lubricant discharge pipe communicating with said expansible chamber through said other slide bearing and having branches for delivering lubricant to the first-named bearing and said one slide bearing, said expansible chamber being extensible and collapsible upon reciprocation of said rod to pump lubricant through said pipes.

GEORGE C. MOLOTZAK.

REFERENCES CITED

The following references are of record in the file of this patent:

UNITED STATES PATENTS

| Number | Name | Date |
|---|---|---|
| 1,799,771 | Wheeler | Apr. 7, 1931 |
| 2,078,775 | Rohlin | Apr. 27, 1937 |
| 2,046,059 | Chronic | June 30, 1939 |